(12) United States Patent
Sasaki

(10) Patent No.: US 10,007,548 B2
(45) Date of Patent: Jun. 26, 2018

(54) TRANSACTION SYSTEM

(71) Applicant: NEC Corporation, Tokyo (JP)

(72) Inventor: Youhei Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 588 days.

(21) Appl. No.: 14/670,451

(22) Filed: Mar. 27, 2015

(65) Prior Publication Data

US 2015/0277966 A1    Oct. 1, 2015

(30) Foreign Application Priority Data

Mar. 27, 2014    (JP) ................................ 2014-066514

(51) Int. Cl.
*G06F 17/30* (2006.01)
*G06F 9/46* (2006.01)

(52) U.S. Cl.
CPC ........ *G06F 9/466* (2013.01); *G06F 17/30371* (2013.01)

(58) Field of Classification Search
None
See application file for complete search history.

(56) References Cited

U.S. PATENT DOCUMENTS

| 6,751,750 | B1 * | 6/2004 | Humlicek | ........... | G06F 11/1471 711/112 |
|---|---|---|---|---|---|
| 2007/0220059 | A1 * | 9/2007 | Lu | ..................... | G06F 17/30368 |
| 2012/0109895 | A1 * | 5/2012 | Zwilling | ............. | G06F 11/1471 707/648 |
| 2015/0286671 | A1 | 10/2015 | Ebiyama | | |

FOREIGN PATENT DOCUMENTS

| JP | 09-062550 | 3/1997 |
|---|---|---|
| JP | 2001-344138 | 12/2001 |
| JP | 2011-76487 | 4/2011 |
| JP | 2012-234509 | 11/2012 |
| WO | WO 2014/068820 | 5/2014 |

OTHER PUBLICATIONS

Teruki Sukenari and Minoru Tamura, "InfoFrame Relational Store", a New Scale-Out Database for Big Data, NEC Technical Journal, vol. 65, No. 2/2012.
Japanese Office Action dated Nov. 28, 2017 in corresponding Japanese Patent Application No. 2014-066514 with English translation of Japanese Office Action.

* cited by examiner

*Primary Examiner* — Belix M Ortiz Ditren
(74) *Attorney, Agent, or Firm* — Young & Thompson

(57) ABSTRACT

A KV data storage part stores a plurality of key value data each being a pair of key and value. The value contains a record of tabular data. The key contains part of column values of the record. A WAL storage part stores an update history of a data group. The data group includes a plurality of KV data referred to and updated by one transaction. The update history has information of a data manipulation instruction in the transaction and the record changed through processing according to the data manipulation instruction. A transaction processor, in commit of the transaction, determines the presence or absence of exclusion violation per record on a basis of the update history stored in the WAL storage part and, if exclusion violation is absent, makes the transaction succeed and records the update history relating to the transaction into the WAL storage part.

11 Claims, 12 Drawing Sheets

FIG. 2

| COLUMN 1 | COLUMN 2 | COLUMN 3 | COLUMN 4 |
|----------|----------|----------|----------|
| WALKEY1 | GROUP1 | 1 | a |
| WALKEY1 | GROUP1 | 2 | b |
| WALKEY1 | GROUP1 | 3 | c |
| WALKEY1 | GROUP2 | 1 | a |
| WALKEY1 | GROUP2 | 2 | b |
| WALKEY1 | GROUP2 | 3 | c |
| WALKEY1 | GROUP2 | 4 | $\alpha$ |
| WALKEY2 | GROUP3 | 1 | $\beta$ |
| WALKEY2 | GROUP3 | 2 | $\gamma$ |

| KEY | VALUE |
|---|---|
| WALKEY1·GROUP1-1 | WALKEY1·GROUP1-1·a |
| WALKEY1·GROUP1-2 | WALKEY1·GROUP1-2·b |
| WALKEY1·GROUP1-3 | WALKEY1·GROUP1-3·c |
| WALKEY1·GROUP2-1 | WALKEY1·GROUP2-1·a |
| WALKEY1·GROUP2-2 | WALKEY1·GROUP2-2·b |
| WALKEY1·GROUP2-3 | WALKEY1·GROUP2-3·c |
| WALKEY1·GROUP2-4 | WALKEY1·GROUP2-4·α |
| WALKEY2·GROUP3-1 | WALKEY2·GROUP3-1·β |
| WALKEY2·GROUP3-2 | WALKEY2·GROUP3-2·γ |

(b)

| KEY | VALUE |
|---|---|
| WALKEY1·GROUP1 | WALKEY1·GROUP1-1·a<br>WALKEY1·GROUP1-2·b<br>WALKEY1·GROUP1-3·c |
| WALKEY1·GROUP2 | WALKEY1·GROUP2-1·a<br>WALKEY1·GROUP2-2·b<br>WALKEY1·GROUP2-3·c<br>WALKEY1·GROUP2-4·α |
| WALKEY1·GROUP3 | WALKEY2·GROUP3-1·β<br>WALKEY2·GROUP3-2·γ |

(c)

| KEY | VALUE |
|---|---|
| WALKEY1 | WALKEY1·GROUP1-1·a<br>WALKEY1·GROUP1-2·b<br>WALKEY1·GROUP1-3·c<br>WALKEY1·GROUP2-1·a<br>WALKEY1·GROUP2-2·b<br>WALKEY1·GROUP2-3·c<br>WALKEY1·GROUP2-4·α |
| WALKEY2 | WALKEY2·GROUP3-1·β<br>WALKEY2·GROUP3-2·γ |

FIG. 5

PRODUCT TABLE                                         T001

| PRODUCT ID | PRODUCT NAME | STOCK | NUMBER OF BIDS | MAXIMUM PRICE |
|---|---|---|---|---|
| i1 | AAA | 10 | 5 | 10000 |
| i2 | BBB | 3 | 7 | 8000 |
| i3 | CCC | 5 | 3 | 3000 |

BID TABLE                                             T002

| ID | PRODUCT ID | USER ID | BID |
|---|---|---|---|
| b1 | i1 | u3 | 9000 |
| b2 | i1 | u1 | 10000 |
| b3 | i3 | u2 | 3000 |
| b4 | i2 | u1 | 8000 |
| b5 | i3 | u3 | 2500 |

TRANSACTION SYSTEM

INCORPORATION BY REFERENCE

This application is based upon and claims the benefit of priority from Japanese patent application No. 2014-066514, filed on Mar. 27, 2014, the disclosure of which is incorporated herein in its entirety by reference.

TECHNICAL FIELD

The present invention relates to a transaction system, a transaction control method, and a program.

BACKGROUND ART

In recent years, as a scalable application execution infrastructure, so-called cloud computing using many computers has been drawing attention. As a scalable persistent data storage unit in a cloud infrastructure, a Key Value Store (KVS) is widely known. A KVS stores Key Value data (KV data) expressed in the form of a pair of Key and Value. However, a general KVS can provide a transaction on only one KV data.

Therefore, a system which supports a transaction on a plurality of KV data is proposed as a first related technique related to the present invention (see Patent Document 1 and Non-Patent Document 1, for example). In the first related technique, for implementation of a transaction on a plurality of KV data, a plurality of KV data to be dealt with in a transaction are grouped and written as one KV data into a KVS. Thus, a transaction on a plurality of KV data is implemented. In this specification, data as a result of gathering a plurality of KV data into one KV data will be referred to as a data group.

Moreover, in the first related technique, optimistic exclusion is used as a system of exclusive control on a KVS. A specific description is as follows. A timestamp is given to each KV data in advance, and when a certain transaction is started, the timestamp is acquired. In a case where the timestamp has not changed since the start of the transaction at the time of update and commit of the KV data, the timestamp is increased by one and written into the KVS. In a case where the timestamp has changed at the time of the commit, the KV data has already been updated during a period from the start of the transaction to the commit, and therefore, the transaction is made to fail. Optimistic exclusion does not use a shared resource such as exclusive control information, and hence, facilitates scaling out.

On the other hand, a transaction system which employs a system of exclusive control called pessimistic exclusion is proposed as a second related technique related to the present invention (see Patent Document 2, for example). In the second related technique, at the time of update processing on a data file in response to a record update request made by a transaction, concurrent access to a record to be updated is exclusively controlled by an exclusive control mechanism. Moreover, update of the record is performed on a buffer, and also, a history of the update of the record on the buffer is generated. At the time of commit of the transaction, a generated update history per record corresponding to the transaction is recorded in a journal file. Then, the data file is updated per block through a write buffer based on the update history recorded in the journal file.

Patent Document 1: Japanese Unexamined Patent Application Publication No. JP-A 2012-234509

Patent Document 2: Japanese Unexamined Patent Application Publication No. JP-A 09-062550 (1997)

Non-Patent Document 1: SUKENARI Teruki, TAMURA Minoru, "'InfoFrame Relational Store,' a New Scale-Out Database for Big Data," NEC Technical Journal, Vol. 65, No. 2/2012

As mentioned above, a KVS is drawing attention as a scalable persistent data storage unit, and a system which supports a transaction on a plurality of KV data in a KVS is proposed. However, with the abovementioned system of optimistic exclusive control on a KVS, only exclusion with one KV data as a unit of exclusion can be realized. In a system which gathers a plurality of KV data into one KV data and executes a transaction, the one KV data obtained by gathering the plurality of KV data is a unit of exclusion. Therefore, transactions which do not constitute exclusion violation originally may be considered to constitute exclusion violation, and consequently, a problem of decrease of concurrent executability of transactions and decrease of throughput arises. It is thought of to apply pessimistic exclusion described in the second related technique related to the present invention and perform exclusion with each of the KV data before gathered into the one large KV data as the exclusion unit, but scaling out is difficult in pessimistic exclusion and it makes no sense to use KV data.

SUMMARY

An object of the present invention is to provide a transaction system which solves the abovementioned problem, that is, the problem that, in a system which executes a transaction on a plurality of KV data, concurrent executability of transactions decreases."

A first aspect of the present invention provides a transaction system including:

a key value data storage unit which stores a plurality of key value data, each of the key value data being a pair of key and value, the value containing a record of tabular data including a plurality of rows or records, and the key containing part of column values of the record contained in the value;

a WAL storage unit which stores an update history of a data group, the data group including the plurality of key value data to be referred to and updated by one transaction, and the update history having information of a data manipulation instruction in the transaction and the record after changed through processing according to the data manipulation instruction;

a transaction processing unit which, in commit of the transaction, determines presence or absence of exclusion violation per record on a basis of the update history stored in the WAL storage unit and, in a case where exclusion violation is absent, makes the transaction succeed and records the update history relating to the transaction into the WAL storage unit; and a WAL reflection processing unit which updates the key value data storage unit on the basis of the update history stored in the WAL storage unit.

A second aspect of the present invention provides a transaction control method executed by a transaction system, the transaction system including:

a key value data storage unit which stores a plurality of key value data, each of the key value data being a pair of key and value, the value containing a record of tabular data including a plurality of rows or records, and the key containing part of column values of the record contained in the value;

a WAL storage unit which stores an update history of a data group, the data group including the plurality of key value data to be referred to and updated by one transaction, and the update history having information of a data manipulation instruction in the transaction and the record after changed through processing according to the data manipulation instruction;

a transaction processing unit; and a WAL reflection processing unit, the transaction control method including:

by the transaction processing unit, in commit of the transaction, determining presence or absence of exclusion violation per record on a basis of the update history stored in the WAL storage unit and, in a case where exclusion violation is absent, making the transaction succeed and recording the update history relating to the transaction into the WAL storage unit; and by the WAL reflection processing unit, updating the key value data storage unit on the basis of the update history stored in the WAL storage unit.

A third aspect of the present invention provides a non-transitory computer readable medium storing a program including instructions for causing a computer to functions as:

a key value data storage unit storing a plurality of key value data, each of the key value data being a pair of key and value, the value containing a record of tabular data including a plurality of rows or records, and the key containing part of column values of the record contained in the value;

a WAL storage unit storing an update history of a data group, the data group including the plurality of key value data to be referred to and updated by one transaction, and the update history having information of a data manipulation instruction in the transaction and the record after changed through processing according to the data manipulation instruction;

a transaction processing unit which, in commit of the transaction, determines presence or absence of exclusion violation per record on a basis of the update history stored in the WAL storage unit and, in a case where exclusion violation is absent, makes the transaction succeed and records the update history relating to the transaction into the WAL storage unit; and a WAL reflection processing unit updating the key value data storage unit on the basis of the update history stored in the WAL storage unit.

With the configurations as described above, the present invention can increase concurrent executability of transactions in a system which gathers a plurality of KV data into one KV data and executes a transaction.

BRIEF DESCRIPTION OF DRAWINGS

FIG. 2 is a view showing an example of the configuration of tabular data;

FIGS. 3A to 3C are views showing configuration examples of KV data generated from tabular data;

FIG. 5 is a view showing an example of tabular data used for description of KV data and a data group in the first exemplary embodiment of the present invention;

EXEMPLARY EMBODIMENT

Next, exemplary embodiments of the present invention will be described in detail referring to the attached drawings.

First Exemplary Embodiment

Figure 1:
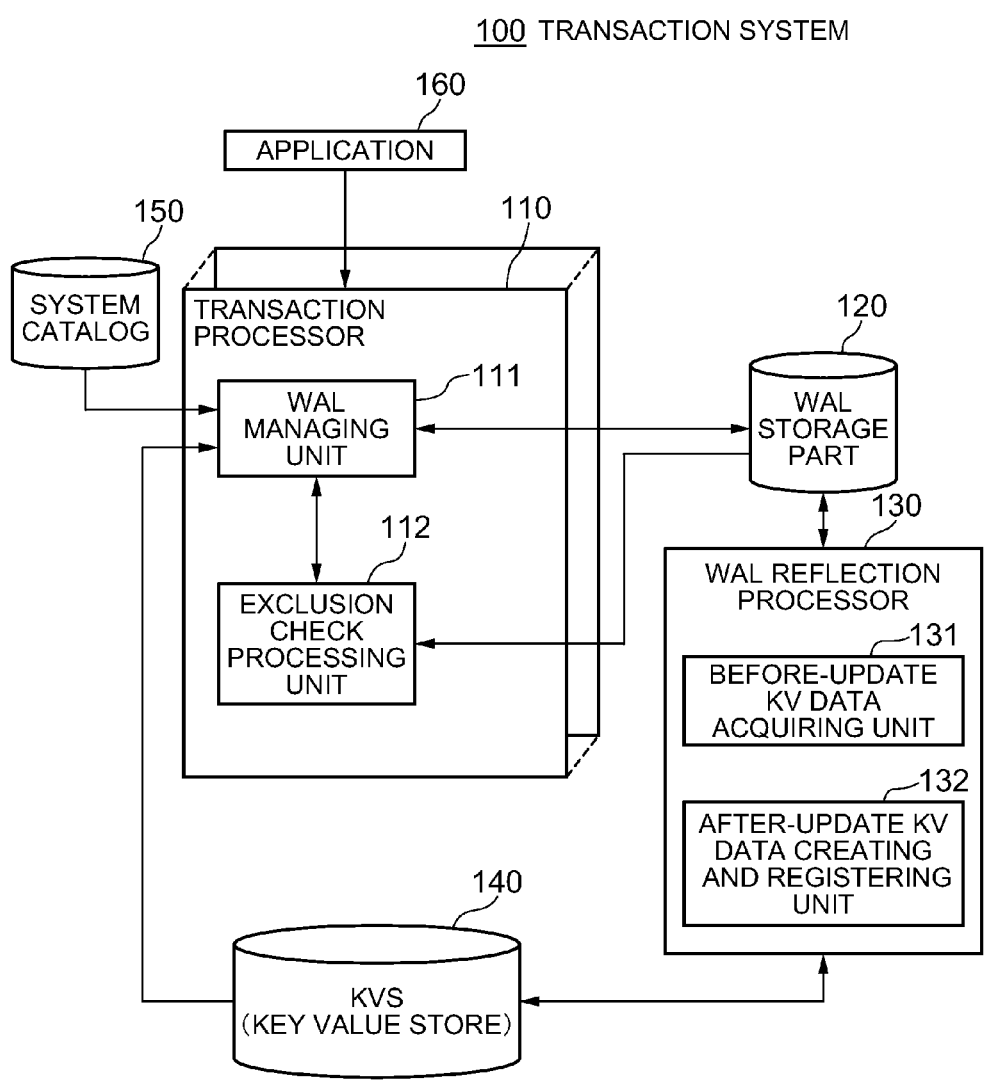
FIG. 1 is a block diagram of a first exemplary embodiment of the present invention.

Referring to FIG. 1, a transaction system 100 according to a first exemplary embodiment of the present invention includes a transaction processor 110, a WAL storage part 120, a WAL reflection processor 130, a KVS 140, a system catalog 150, and an application (an application program) 160.

The KVS 140 has a function of storing KV data. KV data stored in the KVS 140 is KV data generated in accordance with a given conversion rule from tabular data composed of a plurality of records.

FIG. 2 shows an example of the configuration of tabular data. In the tabular data of this example, each row has four columns, and columns 1, 2 and 3 are primary keys. In this specification, a record refers to data of one row in tabular data.

FIGS. 3A to 3C show examples of the configuration of KV data generated from the tabular data shown in FIG. 2. In KV data, the value of Key needs to be unique and a method for defining Key varies depending on a format of storing a record. In the KV data shown in FIG. 3A, Key is a combination of all the primary keys. Therefore, in the KV data shown in FIG. 3A, one KV data corresponds to one record. In other words, one record is stored in Value of KV data. In the KV data shown in FIG. 3B, Key is a combination of the row 1 and the row 2. Therefore, in the KV data shown in FIG. 3B, a plurality of records including the columns 1 and 2 having the same values, respectively, are stored in Value of one KV data. In the KV data shown in FIG. 3C, Key is the row 1. Therefore, in the KV data shown in FIG. 3C, a plurality of records including the columns 1 having the same values are stored in Value of one KV data. Thus, various patterns can be thought of as a conversion rule for generating KV data expressing tabular data, and there is also a conversion rule other than the patterns shown in FIGS. 3A to 3C. KV data stored in the KVS 140 can be KV data generated from tabular data in accordance with any conversion rule. However, for the convenience of explanation, it is assumed below that the KVS 140 stores KV data generated from tabular data by using the conversion rule shown in FIG. 3A that makes one KV data correspond to one record.

The transaction system 100 includes one or more transaction processors 110. Each of the transaction processors 110 is a unit which accepts a transaction inputted by the application 160 and processes the transaction. Each of the transaction processors 110 operates in parallel with the other transaction processor 110. The transaction processor 110 includes a WAL managing unit 111 and an exclusion check processing unit 112.

The WAL managing unit 111 is a unit which, for a transaction inputted by the application 160, creates a data group obtained by logically gathering KV data to be used by the transaction, and writes or retrieves the content of update as a WAL into or from the WAL storage part 120 by using a CAS (Compare And Swap) command or the like.

Now, a WAL (Write Ahead Log) will be explained. In general, Write Ahead Logging refers to writing the content of change before manipulation on a database into a log, and a WAL represents the log itself. Thus, change on a database is first recorded into a log and then reflected onto the database from the log. However, in the present invention, a log is not a physical log but a logical log. A physical log is composed of an image of KV data after update. On the other hand, a logical log is composed of information of a data manipulation instruction in a transaction and a record updated through processing according to the data manipulation instruction. For example, by SQL, information of a data manipulation instruction is information of an instruction such as INSERT, DELETE or UPDATE.

The WAL storage part 120 is a unit which stores a WAL generated or updated by the WAL managing unit 111. The WAL storage part 120 is shared by the plurality of transaction processors 110. In this exemplary embodiment, the WAL storage part 120 is configured by a KVS, and a WAL is stored as KV data composed of Key and Value. For example, by using a CAS command, a KVS can secure atomicity with respect to one KV data, but cannot process a plurality of KV data with atomicity in one transaction. Therefore, by creating a data group in which a plurality of KV data are logically gathered and writing the content of update on the data group as a WAL into the KVS, transactional processing of the plurality of KV data is enabled. The WAL managing unit 111 writes the content of update by a transaction as a WAL into the WAL storage part 120 only in a case where the transaction has succeeded. In FIG. 1, the WAL storage part 120 and the KVS 140 are illustrated as separates KVSs, but may be one KVS.

The exclusion check processing unit 112 has a function of, at the time of commit of a transaction, determining the presence or absence of exclusion violation for each record based on data of a WAL stored into the WAL storage part 120 during a period from start to commit of the transaction and based on records referred to or updated in the transaction. To be specific, firstly, the exclusion check processing unit 112 specifies inserted, deleted or updated records based on information of a data manipulation instruction in the transaction recorded in a WAL stored into the WAL storage part 120 during a period from start to commit of the transaction and based on records updated through processing according to the data manipulation instruction. Next, the exclusion check processing unit 112 compares the specified records with the records referred to or updated in the transaction. In a case where the same records exist, the exclusion check processing unit 112 determines there is exclusion violation and makes the transaction fail. In a case where the same records do not exist, the exclusion check processing unit 11 determines there is no exclusion violation and makes the transaction succeed. As mentioned above, in a case where a transaction has succeeded, the WAL managing unit 111 writes the content of update according to the transaction as a WAL into the WAL storage part 120.

The WAL reflection processor 130 has a function of updating the KVS 140 based on a WAL stored in the WAL storage part 120. The timing of the operation of the WAL reflection processor 130 may be designated with a timer, or a system manager or the like may cause the WAL reflection processor 130 to operate at any timing. The WAL reflection processor 130 includes a before-update KV data acquiring unit 131 and an after-update KV data creating and registering unit 132.

The before-update KV data acquiring unit 131 retrieves a WAL in chronological order from the WAL storage part 120, acquires before-update KV data containing an inserted, deleted or updated record from the KVS 140 based on information of a data manipulation instruction in a transaction recorded in the retrieved WAL and based on a record updated through processing according to the data manipulation instruction, and provides the after-update KV data creating and registering unit 132 with the before-update KV data together with the retrieved WAL.

The after-update KV data creating and registering unit 132 applies the data manipulation instruction in the transaction recorded in the abovementioned WAL to the before-update KV data received from the before-update KV data acquiring unit 131, creates after-update KV data, and registers the after-update KV data into the KVS 140. In other words, the after-update KV data creating and registering unit 132 replaces the before-update KV data on the KVS 140 with the after-update KV data. Moreover, the after-update KV data creating and registering unit 132 deletes the WAL having already been reflected on the KVS 140 from the WAL storage part 120.

The system catalog 150 is a unit which stores data such as meta-information of KV data stored in the KVS 140 and tabular data before conversion and information of a data group created at the time of execution of a transaction. When a transaction is inputted by the application 160, the WAL managing unit 111 extracts information relating to data groups from the system catalog 150, and specifies a data group to be used in the transaction based on the extracted information.

Figure 4:
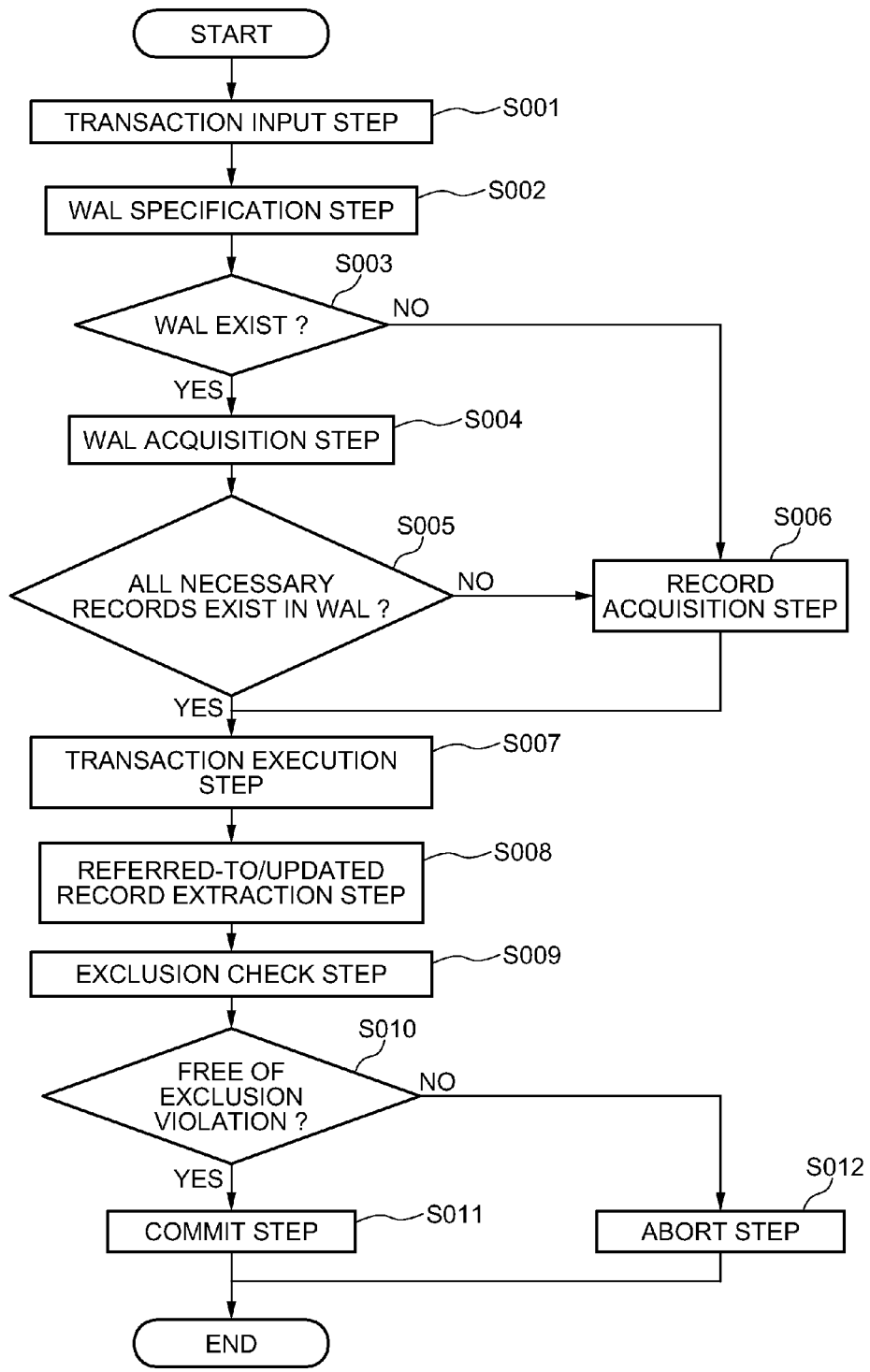
FIG. 4 is a flowchart showing an example of the operation of a transaction processor in the first exemplary embodiment of the present invention.

Next, the operation of this exemplary embodiment will be described. This exemplary embodiment operates in accordance with a flowchart shown in FIG. 4.

First, the application 160 inputs a transaction into this system at a transaction input step S001.

Next, at a WAL specification step S002, the WAL managing unit 111 analyzes the inputted transaction, specifies a data group to which KV data to be processed in the transaction belongs by using the information stored in the system catalog 150, and specifies a WAL in which a past update log of the data group is stored. In this system, a WAL is one KV data of a history of update contents of a data group obtained by logically gathering a plurality of KV data handled in a transaction.

Now, the concept of a data group in this system will be described. It is assumed that there are two kinds of tabular data as shown in FIG. 5, that is, a product table T001 and a bid table T002. Then, it is assumed that the following transaction is executed on the tabular data: "update records of the product table and the bid table when a user makes a new bid."

In processing of such a transaction, a record on the product table and a record on the bid table must be updated with atomicity. However, a KVS secures atomicity with respect to only one KV data. Therefore, for example, in a case where update of KV data having a record of the bid table as Value has failed after update of KV data having a record of the product table as Value, only the record of the product table is updated and there arises a problem that atomicity is not secured.

Therefore, by logically gathering a plurality of KV data relating to a transaction into one KV data, and implementing update of the plurality of KV data by writing into the one KV data, the atomicity of the transaction is secured.

Figure 6:
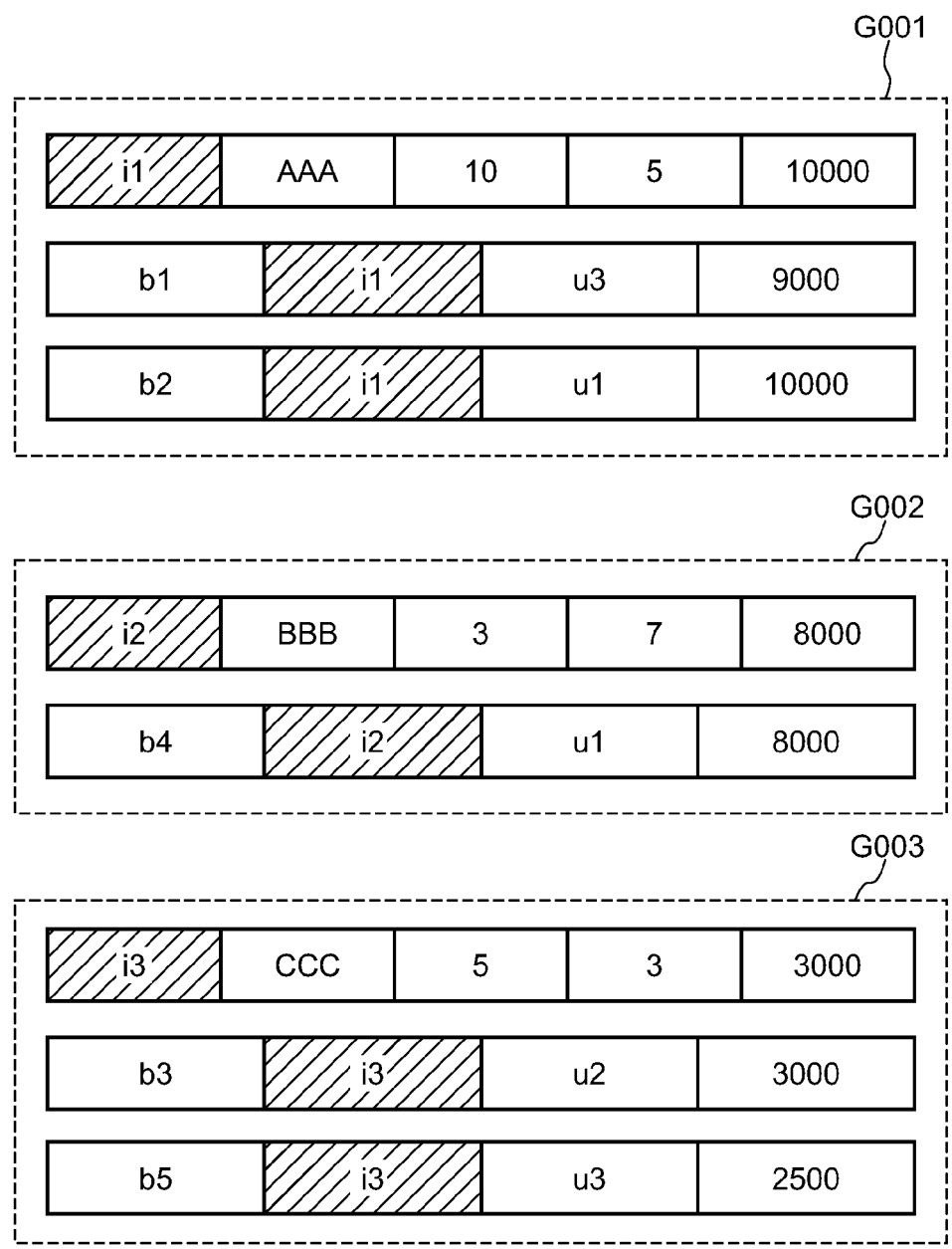
FIG. 6 is a view showing an example of a data group in the first exemplary embodiment of the present invention.

To create a data group, firstly, Key shared by the respective records (a product ID in the example shown in FIG. 5) is extracted. The tabular data shown in FIG. 5 are logically gathered into three groups (G001, G002 and G003) as shown in FIG. 6.

Next, the concept of a WAL in this system will be described. It is assumed that the following two transactions are executed in order on the tabular data shown in FIG. 5:

First transaction "update a bid of a record whose ID is b1 in the bid table T002 to 12000, and update a maximum price of a record whose product ID is i1 in the product table T001 to 12000;" and Second transaction "update a bid of a record whose ID is b2 in the bid table T002 to 13000, and update the maximum price of the record whose product ID is i1 in the product table T001 to 13000."

First, a record on the first row of the product table T001 and a record on the first row of the bid table T002 are updated in the first transaction 1, and the record on the first row of the product table T001 and a record on the second row of the bid table T002 are updated in the second transaction 2. Because the data updated in the two transactions all belong to the same data group, the update results in these transactions are recorded into one WAL. A WAL is configured by the following information:

the value of Key for identifying the WAL; and
information of a data manipulation instruction in a transaction and a record updated through processing according to the data manipulation instruction.

Because a WAL is KV data, it is presented in the form of a pair of (Key, Value). The value of Key used herein is obtained by adding a prefix indicating a WAL to the value of Key which is shared in a data group. In the above example, WAL_i1 is the value of Key of the WAL. The value of Value contains information of a data manipulation instruction in a transaction and a record updated through processing according to the data manipulation instruction. To be specific, a WAL is configured as follows:

WAL=(Key, Value)=(WAL_i1, <[update, (i1, AAA, 10, 5, 12000), (b1, i1, u3, 12000), timestamp 1], [update, (i1, AAA, 10, 5, 13000), (b2, i1, u1, 13000), timestamp 2]>).

Timestamps indicate the order of execution of a transaction on the WAL. A timestamp can be represented by a simple numerical value. Thus, a WAL represents a logical update history of a data group.

To be specific, at a WAL specification step S002, the WAL managing unit 111 specifies a WAL in the following manner.

Firstly, the WAL managing unit 111 extracts tables to be used by the inputted transaction from the transaction, and extracts information about a data group in the tables used by the transaction from the system catalog 150.

The system catalog 150 stores information what tables configure a data group and with what column the data group is configured, in addition to schema information of tables. For example, with respect to the tables shown in FIG. 5, the system catalog 150 stores information "the product table T001 and the bid table T002 configure a data group and the data group is configured with a product ID as Key."

The WAL managing unit 111 specifies a data group to be used by the inputted transaction from the transaction and the information stored by the system catalog 150. For example, in a case where a transaction "update a bid of a record whose ID is b1 in the table T002 to 12000, and update a maximum price of a record whose product ID is i1 in the product table T001 to 12000" is inputted, it is found that tables to be used by the transaction are the product table T001 and the bid table T002, and it is found from the system catalog 150 that the product table T001 and the bid table T002 are grouped with a product ID. Consequently, it is found that a WAL which should be acquired is WAL_i1, and the WAL to be used by the transaction is specified.

Next, the WAL managing unit 111 acquires the WAL from the WAL storage part 120 by using information about the WAL specified at the WAL specification step S002 (step S003). In a case where the WAL is stored in the WAL storage part 120, the WAL managing unit 111 acquires the WAL from the WAL storage part 120 at a WAL acquisition step S004. For use in exclusion check afterward, the WAL managing unit 111 also acquires the latest timestamp of the WAL from the WAL storage part 120.

Figure 7:
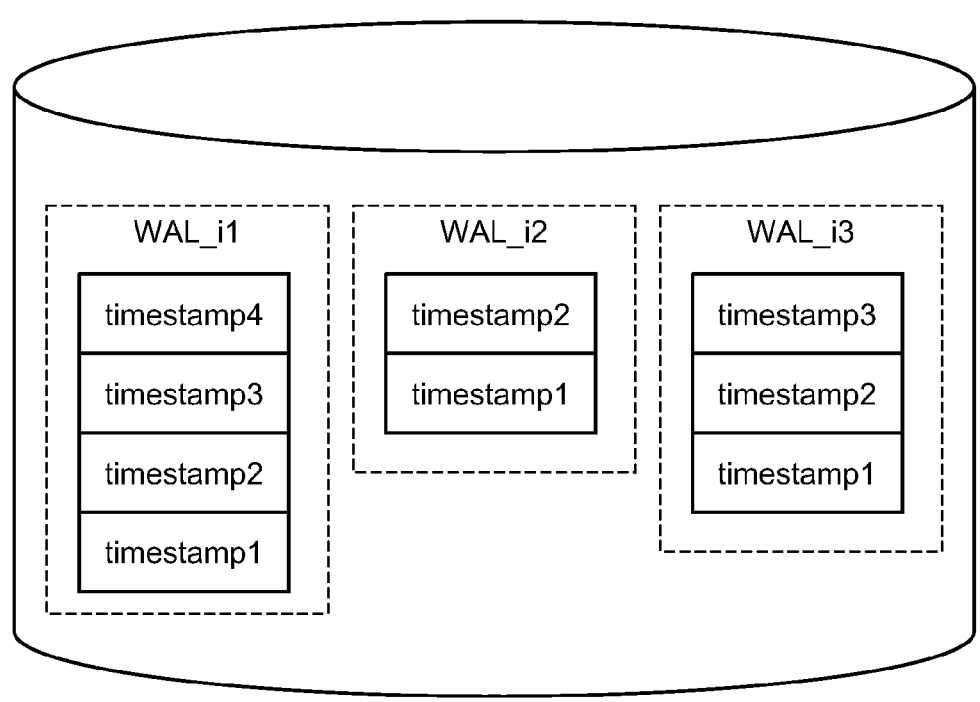
FIG. 7 is a view for describing a WAL stored in a WAL storing unit in the first exemplary embodiment of the present invention.

Now, referring to FIG. 7, how WALs are stored in the WAL storage part 120 will be described.

WALs are stored so that each of the WALs has its history in the WAL storage part 120. For example, when a certain transaction is executed by using WAL_i1, a WAL is stored as a timestamp of WAL_i1, and when a next transaction is executed by using WAL_i1, a WAL is stored as a timestamp 2 of WAL_i1. When a next transaction is executed by using WAL_i2, a WAL is stored as a timestamp 1 of WAL_i2.

The WAL managing unit 111 can know the update history and latest value of each record by checking information of a data manipulation instruction in a transaction contained in each WAL and a record updated through processing according to the data manipulation instruction in chronological order of the values of timestamps.

On the other hand, in a case where the specified WAL is not stored in the WAL storage part 120, the WAL managing unit 111 acquires KV data containing a record to be used by the transaction in Value, from the KVS 140 at a record acquisition step S006.

Even if the specified WAL is stored in the WAL storage part 120, there is a case where all necessary record data are not contained in the WAL stored in the WAL storage part 120. Therefore, the WAL managing unit 111 acquires the WAL from the WAL storage part 120, and thereafter, checks whether or not the WAL contains all the records necessary for processing of the transaction (step S005). If the WAL does not contain a necessary record, the WAL managing unit 111 acquires KV data containing the necessary record in Value from the KVS 140 (step S006).

After acquiring all the records necessary for the transaction from the WAL storage part 120 and the KVS 140, the WAL managing unit 111 launches processing of the transaction by using these records. Then, at a transaction execution step S007, the WAL managing unit 111 newly creates an update log of the data group regarding the transaction as a WAL. At this moment, the WAL managing unit 111 does not write the newly created WAL into the WAL storage part 120 yet.

Next, at a referred-to/updated record extraction step S008, the WAL managing unit 111 extracts information of records referred to and/or updated in the transaction. To be specific, the WAL managing unit 111 acquires information of records updated and/or referred to in the transaction and timestamp information at the start of the transaction. Information of records to be acquired does not need to be the whole record data, but only needs to be the value of Key of each of the records.

The WAL managing unit 111 outputs the record information to the exclusion check processing unit 112. The WAL managing unit 111 may output all the record information including information of referred-to records and information of updated records, or may output only information of updated records. It is possible to regulate an isolation level among transactions depending on whether to output all the information of referred-to records and updated records, or output only the information of updated records. That kind of record information to be outputted can be previously set by a system manager or the like before the system is started.

Next, at an exclusion check step S009, the exclusion check processing unit 112 detects the presence or absence of exclusion violation based on a WAL additionally stored into the WAL storage part 120 during a period from start of the transaction to the current time and a record referred to or updated in the transaction given by the WAL managing unit 111 (step S010). When detecting the presence of exclusion violation, the exclusion check processing unit 112 makes the transaction fail (step S012). When detecting the absence of exclusion violation, the exclusion check processing unit 112 makes the transaction succeed (step S011).

To be specific, firstly, the exclusion check processing unit 112 receives record data referred to or updated in the transaction and the value of the timestamp at the start from the WAL managing unit 111. Next, the exclusion check processing unit 112 acquires the WAL used by the transaction from the WAL storage part 120.

In a case where the latest timestamp of the WAL acquired from the WAL storage part 120 has the same value as the timestamp at the start received from the WAL managing unit 111, another transaction relating to the WAL has not been executed during a period from start of the transaction to the current time. Therefore, the exclusion check processing unit 112 makes the transaction succeed.

On the other hand, in a case where the latest timestamp of the WAL acquired from the WAL storage part 120 has a larger value than the timestamp at the start received from the WAL managing unit 111, another transaction relating to the WAL has been executed during a period from start of the transaction to the current time. Therefore, the exclusion check processing unit 112 checks whether or not there is exclusion violation.

The exclusion violation check is performed in the following manner. Firstly, the exclusion check processing unit 112 extracts all WALs whose timestamps have larger values than the timestamp received from the WAL managing unit 111 from among the WALs acquired from the WAL storage part 120. Then, based on information of data manipulation instructions in transactions and records updated through processing according to the data manipulation instructions written in the extracted WALs, the exclusion check processing unit 112 specifies inserted, deleted or updated records. Next, the exclusion check processing unit 112 compares the specified records with the records referred to and/or updated in the transaction. The exclusion check processing unit 112 determines there is exclusion violation in a case where the same records exist, and determines there is no exclusion violation in a case where the same records do not exist.

Figure 8:
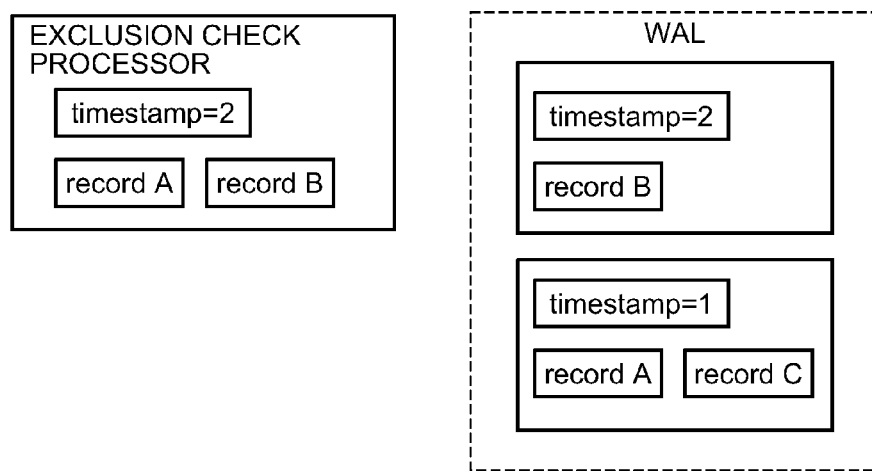
FIG. 8 is a view showing an example of determination by an exclusion check processor that there is no exclusion violation in the first exemplary embodiment of the present invention.
Figure 9:
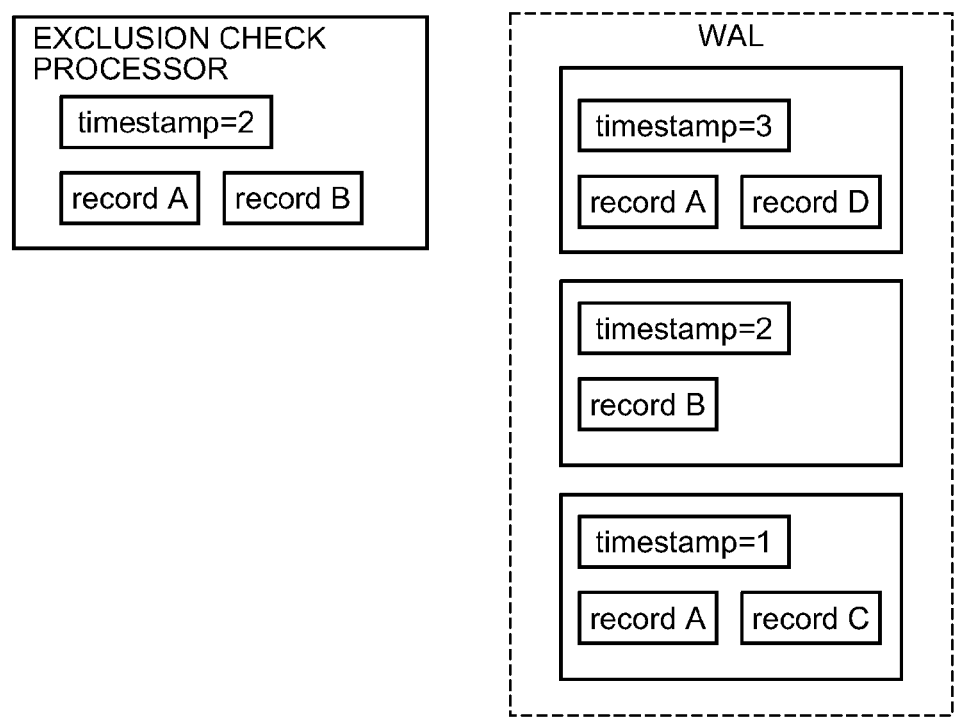
FIG. 9 is a view showing an example of determination by the exclusion check processor that there is exclusion violation in the first exemplary embodiment of the present invention.
Figure 10:
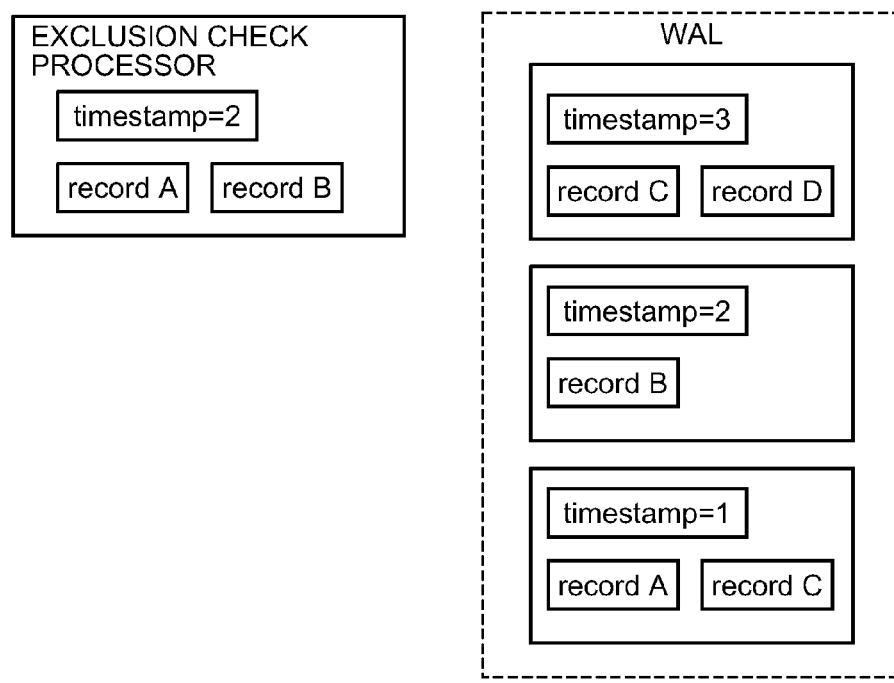
FIG. 10 is a view showing another example of determination by the exclusion check processor that there is no exclusion violation in the first exemplary embodiment of the present invention.

FIGS. 8, 9 and 10 show conceptual views for describing a case where the exclusion check processing unit 112 makes a transaction succeed and a case where the exclusion check processing unit 112 makes a transaction fail. In FIGS. 8 to 10, a timestamp at the start of a transaction and records referred to or updated in the transaction are shown on the left, and timestamps of WALs stored in the WAL storage part 120 and records subjected to data manipulation are shown on the right.

FIG. 8 shows an example of a case where the WAL has not been updated during a period from start of the transaction to execution of the exclusion check by the exclusion check processing unit 112. In this case, another transaction relating to the WAL has not been executed during execution of the transaction, so that the transaction succeeds.

FIG. 9 shows an example of a case where the WAL has been updated during a period from start of the transaction to execution of the exclusion check by the exclusion check processing unit 112. In this case, the exclusion check processing unit 112 extracts a WAL whose timestamp has a larger value than the timestamp at the start held by the exclusion check processing unit 112. In the example shown in FIG. 9, the exclusion check processing unit 112 acquires a WAL whose timestamp is 3. In the example shown in FIG. 9, the WAL whose timestamp is 3 contains information about data manipulation on a record A and a record D. In other words, during a period from start of the transaction to execution of the exclusion check by the exclusion check processing unit 112, the record A and the record D have been updated by another transaction. If the transaction is executed in this case, exclusion violation occurs with respect to the record A, so that the exclusion check processing unit 112 makes the transaction fail.

FIG. 10 shows an example of a case where the WAL has been updated during a period from start of the transaction to execution of the exclusion check by the exclusion check processing unit 112. In this case, the exclusion check processing unit 112 extracts a WAL whose timestamp has a value larger than the timestamp at the start held by the exclusion check processing unit 112. In the example shown in FIG. 10, the exclusion check processing unit 112 acquires a WAL whose timestamp is 3. In the example shown in FIG. 10, the WAL whose timestamp is 3 contains information about data manipulation on a record C and a record D. In other words, during a period from start of the transaction to execution of the exclusion check by the exclusion check processing unit 112, the record C and the record D have been updated by another transaction. Even if the transaction is executed in this case, exclusion violation does not occur with respect to any record, so that the exclusion check processing unit 112 makes the transaction succeed.

When detecting no exclusion violation, the exclusion check processing unit 112 requests the WAL managing unit 111 to commit the transaction. When requested to commit the transaction, the WAL managing unit 111 writes the WAL of the transaction into the WAL storage part 120 (step S011). The value of a timestamp of the WAL to be written in is the next value to the value of the latest timestamp stored in the WAL storage part 120. For example, in the example shown in FIG. 8, the WAL managing unit 111 writes a WAL having information of data manipulation regarding the record A (information of a data manipulation instruction in a transaction and a record updated through processing according to the data manipulation instruction; the same will apply hereinafter), information of data manipulation regarding the record B, and a timestamp having a value 3. Further, in the example shown in FIG. 10, the WAL managing unit 111 writes a WAL having information of data manipulation regarding the record A, information of data manipulation regarding the record B, and a timestamp having a value 4.

On the other hand, when detecting exclusion violation, the exclusion check processing unit 112 requests the WAL managing unit 11 to abort the transaction. When requested to abort the transaction, the WAL managing unit 111 discards the WAL of the transaction (step S012).

Figure 11:
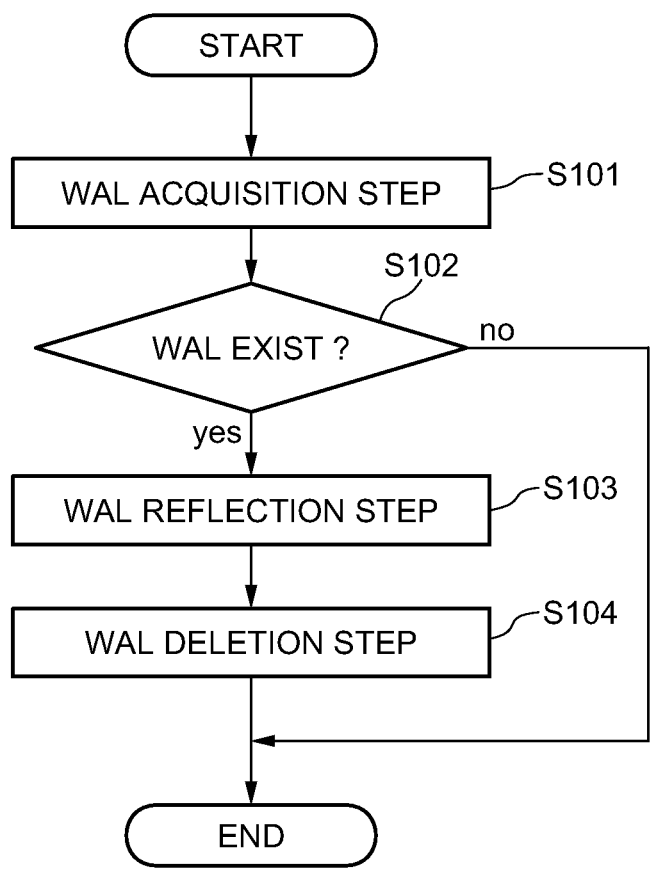
FIG. 11 is a flowchart showing an example of the operation of a WAL reflecting unit in the first exemplary embodiment of the present invention.

Next, an operation of reflecting a WAL stored in the WAL storage part 120 onto the KVS 140 in this exemplary embodiment will be described. The reflection of a WAL onto the KVS is performed in accordance with a flowchart shown in FIG. 11.

First, the before-update KV data acquiring unit 131 of the WAL reflection processor 130 acquires the oldest one of WALs stored in the WAL storage part 120 from the WAL storage part 120 at a WAL acquisition step S101. In a case where no WAL is stored in the WAL storage part 120, the before-update KV data acquiring unit 131 ends processing shown in FIG. 11 (no at step S102).

In a case where a WAL is stored in the WAL storage part 120 (yes at step S102), based on information of a data manipulation instruction in a transaction contained in the acquired WAL and based on a record updated through processing according to the data manipulation instruction, the before-update KV data acquiring unit 131 acquires before-update KV data containing the record having been subjected to the update in Value from the KVS 140 at a before-update KV data acquisition step S103.

Next, at an after-update KV data creation step S104, the after-update KV data creating and registering part 132 executes the processing according to the data manipulation instruction in the transaction contained in the acquired WAL on the acquired before-update KV data, and creates after-update KV data. Next, the after-update KV data creating and registering part 132 registers the created after-update KV data into the KVS 140. Next, at a WAL deletion step, the after-update KV data creating and registering part 132 deletes the acquired WAL from the WAL storage part 120.

After that, the WAL reflection processor 130 returns to the WAL acquisition step S101, and repeats the same operation as described above.

With respect to certain KV data, in a case where a WAL contains information of a data manipulation instruction in a transaction and a record updated through processing according to the data manipulation instruction, KV data having been subjected to the processing according to the data manipulation instruction is the latest information about the KV data. Therefore, the latest KV data is stored into the KVS 140 at a time point that the WAL reflection processor 130 executes the data manipulation contained in the WAL on before-update KV data stored in the KVS 140. With respect to certain KV data, in a case where a WAL does not exist, KV data stored in the KVS 140 is the latest information.

A process of processing a transaction inputted by the application 160, namely, a transaction processor, and a process of reflecting a WAL, namely, a WAL reflection processor operate in parallel. The process of reflecting a WAL may be executed every given time by using a timer, or a system manager or the like may execute the process at any timing.

Thus, according to this exemplary embodiment, at the time of execution of transaction exclusion control on a system which supports a transaction on a plurality of KV data in a KVS, by executing exclusion control per record referred to or updated in the transaction, instead of executing exclusion control per data group subjected to the transaction, it is possible to make the transaction exclusion unit smaller, and it is possible to raise concurrent executability of transactions and increase throughput.

Further, according to this exemplary embodiment, a WAL stored in the WAL storage part 120 is a logical log, namely, a WAL which has information of a data manipulation instruction and a record changed through processing according to the data manipulation instruction. Therefore, even if KV data stored in the KVS 140 is KV data generated from tabular data in accordance with any conversion rule, it is possible to execute exclusion control per record in the tabular data.

Second Exemplary Embodiment

Figure 12:
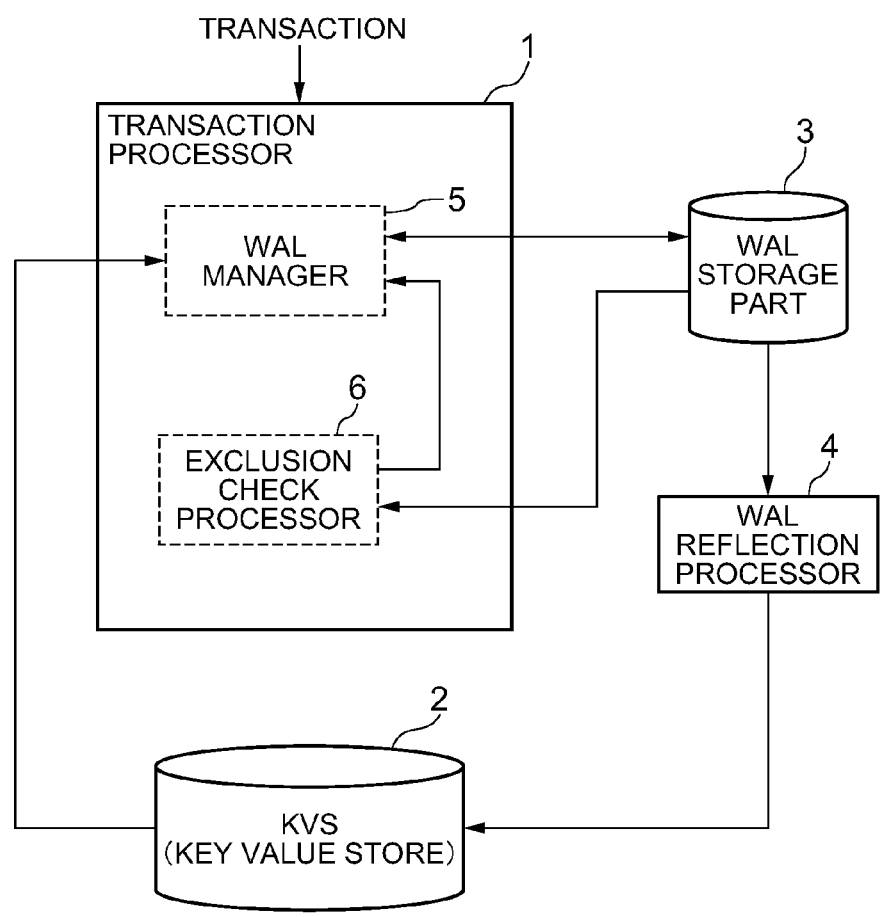
FIG. 12 is a block diagram of a second exemplary embodiment of the present invention.

FIG. 12 is a block diagram of a second exemplary embodiment of the present invention. As shown in FIG. 12, this exemplary embodiment includes one or more transaction processors 1, a KVS 2, a WAL storage part 3, and a WAL reflection processor 4.

The KVS 2, which is configured by a semiconductor memory, a magnetic disk or the like, stores a record expressed in the form of a pair of Key and Value. To be specific, the KVS 2 stores KV data expressed in the form of a pair of Key and Value, and in the KV data, a record in tabular data including a plurality of records is stored in Value and the value of a column which is part of the record stored in Value is stored in Key.

The WAL storage part 3 is configured by a semiconductor memory, a magnetic disk, or the like. The WAL storage part 3 stores a logical log per data group obtained by gathering a plurality of KV data into one KV data. Preferably, the WAL storage part 3 stores an update log expressed in the form of pair of Key and Value. The Key is a value for uniquely identifying a data group that is data obtained by gathering a plurality of KV data. Moreover, the Value represents an update history of the data group. Furthermore, the update history has one or more partial update histories. Each partial update history has information of a data manipulation instruction on a record stored in Value of the KV data configuring the data group, the record changed through processing according to the data manipulation instruction, and a timestamp indicating the order of update.

The transaction processor 1 has a function of executing a transaction inputted by an application program or the like which is not shown in the drawings. At the time of commit of a transaction of referring to and updating the data group, the transaction processor 1 determines the presence or absence of exclusion violation per record based on the update history stored in the WAL storage part 3. In a case where there is no exclusion violation, the transaction processor 1 makes the transaction succeed and records the update history into the WAL storage part 3. Preferably, the transaction processor 1 has a WAL managing part 5 and an exclusion check processor 6 as major function parts.

The WAL managing part 5 has a function of acquiring the latest value of the record configuring the data group used by the inputted transaction, from the WAL storage part 3 and the KVS 2. Moreover, the WAL managing part 5 has a function of acquiring the latest timestamp in the update log corresponding to the data group as a start timestamp from the WAL storage part 3.

The exclusion check processor 6 has a function of, at the time of commit of a transaction being executed by the transaction processor 1, comparing the start timestamp acquired at the start of the transaction with a commit timestamp that is the latest timestamp of the data group stored in the WAL storage part 3 at present. Moreover, the exclusion check processor 6 has a function, in a case where the start timestamp is different from the commit timestamp as a result of the comparison, determining whether or not information of a data manipulation instruction on the same record as a record used by the transaction exists in a partial update history having a later timestamp than the start timestamp. Furthermore, the exclusion check processor 6 has a function of deciding whether to make the transaction succeed or fail based on the result of the determination, and in the case of deciding to make the transaction succeed, adding a new partial update history containing information of a data manipulation instruction in the transaction of referring to and updating the record, the record changed through processing according to the data manipulation instruction and a timestamp which is later than the commit timestamp, to the update log stored at present in the WAL storage part 3 corresponding to the data group.

The WAL reflection processor 4 has a function of updating KV data stored by the KVS 2 based on information of a data manipulation instruction in an update history stored in the WAL storage part 3 and based on a record changed through processing according to the data manipulation instruction.

The transaction system according to this exemplary embodiment can be implemented by a computer having a processor such as an MPU, a memory connected to the processor, an input/output device, a communication interface and so on, and a program executed by the computer. The program is recorded on a computer readable recording medium such as a magnetic disk device. By causing the processor such as an MPU to read the program when starting up the computer, and controlling the operation of the processor, the WAL managing part 5, the exclusion check processor 6 and the WAL reflection processor 4 are implemented on the processor.

Next, the operation of this exemplary embodiment will be described.

The transaction processor 1 executes a transaction inputted thereinto. At the time of commit of a transaction of referring to and updating a data group, the transaction processor 1 determines the presence or absence of exclusion violation per record based on an update history stored in the WAL storage part 3. In a case where there is no exclusion violation, the transaction processor 1 makes the transaction succeed, and records the update history into the WAL storage part 3. After that, the WAL reflection processor 4 updates the KVS 2 based on the update history stored in the WAL storage part 3.

More preferably, this exemplary embodiment performs in the following manner.

When a transaction is inputted, the transaction processor 1 acquires the latest values of KV data configuring a data group to be used by the transaction from the WAL storage part 3 and the KVS 2, also acquires the latest timestamp in an update log corresponding to the data group as a start timestamp from the WAL storage part 3, and starts execution of the transaction.

At the time of commit of the transaction being executed, the transaction processor 1 compares the start timestamp acquired at the start of the transaction with a commit timestamp that is the latest timestamp of the data group stored at present in the WAL storage part 3. Next, in a case where the start timestamp is different from the commit timestamp, the transaction processor 1 retrieves all partial update histories having later timestamps than the start timestamp from the WAL storage part 3, and determines whether or not the partial update histories include information of a data manipulation instruction on a record used by the transaction (a referred-to or updated record, or an updated record).

The transaction processor 1 decides whether to make the transaction succeed or fail based on the comparison result and the determination result. To be specific, the transaction processor 1 makes the transaction succeed in a case where the start timestamp is the same as the commit timestamp, or in a case where the start timestamp is different from the commit timestamp but none of the partial update histories having the later timestamps than the start timestamp includes the information of the data manipulation instruction on the record used by the transaction (the referred-to or updated record, or the updated record). However, in a case where the start timestamp is different from the commit timestamp and besides the partial update history having the later timestamp than the start timestamp includes the information of the data manipulation instruction on the record used by the transaction (the referred-to or updated record, or the updated record), the transaction processor 1 makes the transaction fail.

In the case of deciding to make the transaction succeed, the transaction processor 1 creates a new partial update history having the information of the data manipulation instruction in the transaction, the record updated through processing according to the data manipulation instruction and the later timestamp than the commit timestamp, and adds the new partial update history to the update log stored at present in the WAL storage part 3 so as to correspond to the data group used by the transaction. Because an update log is one key value data expressed in the form of a pair of Key and Value, it is possible to secure the atomicity of data manipulation by using a CAS command or the like.

On the other hand, the WAL reflection processor 4 updates KV data stored by the KVS 2, for example, regularly, based on information of a data manipulation instruction in an update log stored in the WAL storage part 3 and a record to be changed through processing according to the data manipulation operation. Execution of this update using a CAS command or the like makes it possible to secure atomicity of data manipulation.

Thus, according to this exemplary embodiment, it is possible to raise concurrent executability of transactions in a system which gathers a plurality of KV data into one KV data and executes a transaction. This is because optimistic exclusion is performed per record.

The present invention has been described above referring to the exemplary embodiments. However, the present invention is not limited to the exemplary embodiments. The configurations and details of the present invention can be changed and modified in various manners that can be understood by one skilled in the art within the scope of the present invention. For example, configurations as shown below are also included by the present invention.

It is possible to configure to detect the presence or absence of exclusion violation per column in a record, by including, in information of a data manipulation instruction recorded in a WAL stored in the WAL storage part, information of a column subjected to manipulation in addition to information of an instruction such as INSERT, DELETE or UPDATE and a record updated through processing according to the data manipulation instruction.

The WAL reflection processor may be configured to, among a plurality of partial update histories of an update log having been reflected onto the KVS, leave a given number of partial update histories having the latest timestamps without deleting, and record information for identifying the reflected partial update histories left without deleted on an update history.

Further, the WAL reflection processor may be configured to decide the timing of reflection of an update log onto the KVS based on the idle state of the CPU configuring the transaction system and the usage of the storage device configuring the WAL storing unit.

The present invention can be utilized in a system which executes a transaction by using a KVS as a persistent data storage unit.

The invention claimed is:

1. A transaction system comprising:
   a key value data storage unit configured to store a plurality of key value data, each of the key value data being a pair of key and value, the value containing a record of tabular data including a plurality of rows or records, and the key containing part of column values of the record contained in the value;
   a WAL (Write Ahead log) storage unit configured to store an update history of a data group, the data group including the plurality of key value data to be referred to and updated by one transaction, and the update history having information of a data manipulation instruction in the transaction and the record after changed through processing according to the data manipulation instruction;
   a transaction processing unit configured to, in commit of the transaction, determine presence or absence of exclusion violation per record on a basis of the update history stored in the WAL (Write Ahead log) storage unit and, in a case where exclusion violation is absent, make the transaction succeed and record the update history relating to the transaction into the WAL (Write Ahead log) storage unit; and
   a WAL (Write Ahead log) reflection processing unit configured to update the key value data storage unit on the basis of the update history stored in the WAL (Write Ahead log) storage unit.

2. The transaction system according to claim 1, wherein the WAL (Write Ahead log) reflection processing unit includes:
   a before-update KV data acquiring unit configured to acquire before-update key value data containing the record of an update target from the key value data storage unit on the basis of the update history stored in the WAL (Write Ahead log) storage unit; and
   an after-update KV data creating and registering unit configured to create after-update key value data by executing the processing according to the data manipulation instruction included in the update history on the before-update key value data, and store the created key value data into the key value data storage unit.

3. The transaction system according to claim 1, wherein,
   the WAL (Write Ahead log) storage unit stores an update log that is a pair of key and value, the key of the update log being a unique value for identifying the data group, the value of the update log being the update history of the data group, the update history of the data group having at least one partial update history, and the partial update history having the information of the data manipulation instruction to the record contained in the key value data belonging to the data group, the record after updated through the processing according to the data manipulation instruction and a timestamp indicating an order of update; and
   the transaction processing unit includes:
      a WAL (Write Ahead log) managing unit configured to acquire a latest value of the key value data belonging to the data group used by the transaction from the WAL (Write Ahead log) storage unit and the key value data storage unit, also acquire as a start timestamp the latest timestamp in the update log that is the update history of the data group from the WAL (Write Ahead log) storage unit, and then execute the transaction; and
      an exclusion check processing unit configured to perform comparison of the start timestamp with a commit timestamp that is the latest timestamp in the update log that is the update history of the data group stored in the WAL (Write Ahead log) storage unit in commit of the transaction, also perform determination of whether or not information of a data manipulation instruction to a record identical to the record subjected to manipulation by the transaction is included in the partial update history having a later timestamp than the start timestamp, then decide whether to make the transaction succeed or fail on a basis of a result of the comparison and a result of the determination, and in a case of deciding to make the transaction succeed, add a new partial update history to the update log that is the update history of the data group stored in the WAL (Write Ahead log) storage unit, the new partial update history having the information of the data manipulation instruction to the record updated in the transaction, the record updated through the processing according to the data manipulation instruction and a later timestamp than the commit timestamp.

4. The transaction system according to claim 3, wherein the manipulation is to refer to or update.

5. The transaction system according to claim 3, wherein the manipulation is to update.

6. A transaction control method executed by a transaction system, the transaction system including:
   a key value data storage unit configured to store a plurality of key value data, each of the key value data being a pair of key and value, the value containing a record of tabular data including a plurality of rows or records, and the key containing part of column values of the record contained in the value;
   a WAL (Write Ahead log) storage unit configured to store an update history of a data group, the data group including the plurality of key value data to be referred to and updated by one transaction, and the update history having information of a data manipulation instruction in the transaction and the record after changed through processing according to the data manipulation instruction;
   a transaction processing unit; and
   a WAL (Write Ahead log) reflection processing unit,
   the transaction control method comprising:
      by the transaction processing unit, in commit of the transaction, determining presence or absence of exclusion violation per record on a basis of the update history stored in the WAL (Write Ahead log) storage unit and, in a case where exclusion violation is absent, making the transaction succeed and recording the update history relating to the transaction into the WAL (Write Ahead log) storage unit; and
      by the WAL (Write Ahead log) reflection processing unit, updating the key value data storage unit on the basis of the update history stored in the WAL (Write Ahead log) storage unit.

7. The transaction control method according to claim 6, comprising, by the WAL (Write Ahead log) reflection processing unit:

acquiring before-update key value data containing the record of an update target from the key value data storage unit on the basis of the update history stored in the WAL (Write Ahead log) storage unit;

creating after-update key value data by executing the processing according to the data manipulation instruction included in the update history on the before-update key value data; and storing the created key value data into the key value data storage unit.

8. The transaction control method according to claim 6, comprising:

by the WAL (Write Ahead log) storage unit, storing an update log that is a pair of key and value, the key of the update log being a unique value for identifying the data group, the value of the update log being the update history of the data group, the update history of the data group having at least one partial update history, and the partial update history having the information of the data manipulation instruction to the record contained in the key value data belonging to the data group, the record after updated through the processing according to the data manipulation instruction and a timestamp indicating an order of update; and by the transaction processing unit:

acquiring a latest value of the key value data belonging to the data group used by the transaction from the WAL (Write Ahead log) storage unit and the key value data storage unit, also acquiring as a start timestamp the latest timestamp in the update log that is the update history of the data group from the WAL (Write Ahead log) storage unit, and then executing the transaction; and in commit of the transaction, performing comparison of the start timestamp with a commit timestamp that is the latest timestamp in the update log that is the update history of the data group stored in the WAL (Write Ahead log) storage unit in commit of the transaction, also performing determination of whether or not information of a data manipulation instruction to a record identical to the record subjected to manipulation by the transaction is included in the partial update history having a later timestamp than the start timestamp, then deciding whether to make the transaction succeed or fail on a basis of a result of the comparison and a result of the determination, and in a case of deciding to make the transaction succeed, adding a new partial update history to the update log that is the update history of the data group stored in the WAL (Write Ahead log) storage unit, the new partial update history having the information of the data manipulation instruction to the record updated in the transaction, the record updated through the processing according to the data manipulation instruction and a later timestamp than the commit timestamp.

9. The transaction control method according to claim 8, wherein the manipulation is to refer to or update.

10. The transaction control method according to claim 8, wherein the manipulation is to update.

11. A non-transitory computer readable medium storing a program comprising instructions for causing a computer to functions as:

a key value data storage unit configured to store a plurality of key value data, each of the key value data being a pair of key and value, the value containing a record of tabular data including a plurality of rows or records, and the key containing part of column values of the record contained in the value;

a WAL (Write Ahead log) storage unit configured to store an update history of a data group, the data group including the plurality of key value data to be referred to and updated by one transaction, and the update history having information of a data manipulation instruction in the transaction and the record after changed through processing according to the data manipulation instruction;

a transaction processing unit configured to, in commit of the transaction, determine presence or absence of exclusion violation per record on a basis of the update history stored in the WAL (Write Ahead log) storage unit and, in a case where exclusion violation is absent, make the transaction succeed and record the update history relating to the transaction into the WAL (Write Ahead log) storage unit; and a WAL (Write Ahead log) reflection processing unit configured to update the key value data storage unit on the basis of the update history stored in the WAL (Write Ahead log) storage unit.

* * * * *